United States Patent
Minobe

(10) Patent No.: US 9,052,676 B2
(45) Date of Patent: Jun. 9, 2015

(54) HIGH-VOLTAGE POWER SOURCE

(75) Inventor: Taro Minobe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/809,114

(22) PCT Filed: Jul. 4, 2011

(86) PCT No.: PCT/JP2011/003790
§ 371 (c)(1),
(2), (4) Date: Jan. 8, 2013

(87) PCT Pub. No.: WO2012/004960
PCT Pub. Date: Jan. 12, 2012

(65) Prior Publication Data
US 2013/0114970 A1 May 9, 2013

(30) Foreign Application Priority Data
Jul. 9, 2010 (JP) .................. 2010-156922

(51) Int. Cl.
| H02M 3/07 | (2006.01) |
| G03G 15/00 | (2006.01) |
| H02M 3/155 | (2006.01) |
| H02M 7/04 | (2006.01) |
| H02M 7/10 | (2006.01) |
| H02M 1/00 | (2006.01) |

(52) U.S. Cl.
CPC ............... *G03G 15/80* (2013.01); *H02M 3/07* (2013.01); *H02M 3/155* (2013.01); *H02M 7/103* (2013.01); *H02M 2001/009* (2013.01); *H02M 7/04* (2013.01)

(58) Field of Classification Search
CPC ......... H02M 3/07; H02M 3/073; H02M 7/10; H02M 7/103; H02M 7/106
USPC ............ 363/59, 60, 61; 399/88; 307/109, 110
See application file for complete search history.

(56) References Cited

U.S. PATENT DOCUMENTS 5,159,544 A * 10/1992 Hughey et al. .................. 363/97
5,572,414 A * 11/1996 Komori ........................... 363/60
(Continued)

FOREIGN PATENT DOCUMENTS

| CN | 1488983 A | 4/2004 |
| JP | 2-065659 A | 3/1990 |

(Continued)

OTHER PUBLICATIONS

Fang Lin Luo "Positive Output Super-Lift Converters", IEEE Transactions on Power Electronics, vol. 18, No. 1, Jan. 2003, pp. 105-113.

*Primary Examiner* — Gary L Laxton
(74) *Attorney, Agent, or Firm* — Canon U.S.A., Inc. IP Division

(57) ABSTRACT

A high-voltage power source includes a switching unit configured to be driven according to a frequency signal, a voltage resonance unit configured to generate a voltage according to driving of the switching unit, a rectification unit configured to rectify and amplify the voltage generated by the voltage resonance unit, a separation unit configured to separate an alternating current generated by the voltage resonance unit and a direct current generated by the rectification unit from each other, and a current detection unit configured to detect the current generated by the voltage resonance unit.

18 Claims, 9 Drawing Sheets

(56) References Cited

U.S. PATENT DOCUMENTS

| | | | |
|---|---|---|---|
| 5,703,770 A * | 12/1997 | Burtin et al. | 363/61 |
| 5,847,945 A * | 12/1998 | Burtin et al. | 363/60 |
| 7,088,080 B2 * | 8/2006 | Kameda et al. | 323/222 |
| 7,598,476 B2 * | 10/2009 | Chae et al. | 219/216 |
| 2008/0260402 A1 | 10/2008 | Yasukawa | |

FOREIGN PATENT DOCUMENTS

| | | |
|---|---|---|
| JP | 4-208066 A | 7/1992 |
| JP | 6-309044 A | 11/1994 |
| JP | 9-093914 A | 4/1997 |
| JP | 2000-003103 A | 1/2000 |
| JP | 2000-227808 A | 8/2000 |
| JP | 2003-189595 A | 7/2003 |
| JP | 2004-048952 A | 2/2004 |
| JP | 2007-327816 A | 12/2007 |
| JP | 2009-542189 A | 11/2009 |
| KR | 10-2005-0048714 A | 5/2005 |
| WO | 2011-077583 A1 | 6/2011 |

* cited by examiner vi1: TARGET VALUE OF CURRENT
T1: Q101 DRIVE (ON/OFF) CYCLE AT
    Q101 DRAIN VOLTAGE vd1 (T1 > 0)
T2: Q101 DRIVE (ON/OFF) CYCLE AT
    Q101 DRAIN VOLTAGE vd2 (T2 > T1 > 0, WHERE vd2 > vd1)

HIGH-VOLTAGE POWER SOURCE

TECHNICAL FIELD

The present invention relates to a high voltage power source configured to generate a high voltage.

BACKGROUND ART

A conventional image forming apparatus, such as a copying machine, a printer, and a facsimile apparatus, employs an electrophotographic method. During image forming, the electrophotographic type image forming apparatus applies a high voltage to a developing member configured to develop a latent image that has been formed on an image bearing member by using a toner, which is a developer, to a charging member that evenly charges the image bearing member, and to a transfer member that transfers the toner image that has been formed on the image bearing member onto to recording material.

As a high-voltage power source that outputs a high voltage to a plurality of members used during image forming, a high-voltage power so time that uses a winding type electromagnetic transformer is used. For example, Japanese Patent Application Laid-Open No. 06-309044 discusses a high-voltage power source that uses an electromagnetic transformer.

FIG. 7 illustrates an example of a high-voltage power source that outputs bipolar high voltages by using two electromagnetic transformers. Referring to FIG. 7, a high-voltage power source 713, which outputs a negative voltage, includes an electromagnetic transformer 701.

The electromagnetic transformer 701 generates an alternating current (AC) high voltage on a secondary winding with AC power applied to a transformer primary winding via a primary drive circuit 705 for the electromagnetic transformer 701, which includes a switching element. The AC high voltage generated on the secondary winding is rectified and smoothed by a diode 702 and a capacitor 703 to be output as a negative direct current (DC) voltage. In addition, the negative high-voltage power source 713 includes a bleeder resistor 704.

On the other hand, a high-voltage power source 712, which generates a positive voltage, includes an electromagnetic transformer 706 similar to the negative-voltage high-voltage power source 713. The high-voltage power source 712 generates an AC high voltage on the secondary winding with AC power applied to a primary winding of the electromagnetic transformer 706 via a primary drive circuit 710.

The generated AC high voltage is rectified and smoothed by a diode 707 and high-voltage capacitor 708 to be output as a positive DC high voltage. In addition, the positive high-voltage power source 712 includes a bleeder resistor 709.

The negative high-voltage power source 713 and the positive voltage high-voltage power source 712 are serially connected. The DC high voltage that has been generated by each high-voltage power source is applied to a load 711 via the bleeder resistor 704 or 709. In addition, the negative high-voltage power source 713 includes a current detection circuit 714.

In recent years, it is desired by the market that an image forming apparatus be as small-sized and lightweight as possible and can be manufactured with low costs. In this order, it becomes necessary to reduce the size, the weight, and the costs of a high-voltage power source mounted on the image forming apparatus.

In reducing the size, the weight, and the costs of the high-voltage power source illustrated in FIG. 7, which uses an electromagnetic transformer, the following issue may arise. Generally, the height (vertical dimension) and the volume of an electromagnetic transformer are larger than those of other electronic components. Accordingly, in further reducing the size of a high-voltage power source, it is important to reduce the size of the electromagnetic transformer.

Because an electromagnetic transformer outputs a necessarily high voltage as described above, it is required to provide a winding of a number of windings greater than a predetermined number. Accordingly, the size of an electromagnetic transformer configured to output a high voltage may not be easily reduced.

In general, a ferrite electromagnetic transformer or a copper electromagnetic transformer is widely used. Accordingly, the electromagnetic transformer like this is heavier than other electronic components. Accordingly, the weight of a high-voltage power source may not be easily reduced. In addition, because the electromagnetic transformer is made of ferrite or copper, the costs for manufacturing, the electromagnetic transformer may become higher than the costs for manufacturing other electronic components. Accordingly, the costs for the high-voltage power source may not be easily reduced due to the high costs for the electromagnetic transformer.

As described above, a further reduction of the size, the weight, and the costs for the high-voltage power source using an electromagnetic transformer is limited. In other words, in further reducing the size, the weight, and the costs of an image forming apparatus including a plurality of high-voltage, power sources, the size, the weight, and the costs of the high-voltage power sources may be the issue.

SUMMARY OF INVENTION

The present invention is directed to a method for effectively reducing the size, the weight, and the costs of a high-voltage power source.

According to an aspect of the present invention, a high-voltage power source includes a switching unit configured to be driven according to a frequency signal, a voltage resonance unit configured to generate a voltage according to driving of the switching unit, a rectification unit configured to rectify and amplify the voltage generated by the voltage resonance unit, a separation unit configured to separate an alternating current generated by the voltage resonance unit and a direct current generated by the rectification unit from each other, and a current detection unit configured to detect the current generated by the voltage resonance unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF EMBODIMENTS

Various exemplary embodiments, features, and aspects of the invention will be described in detail below with reference to the drawings.

Figure 1:
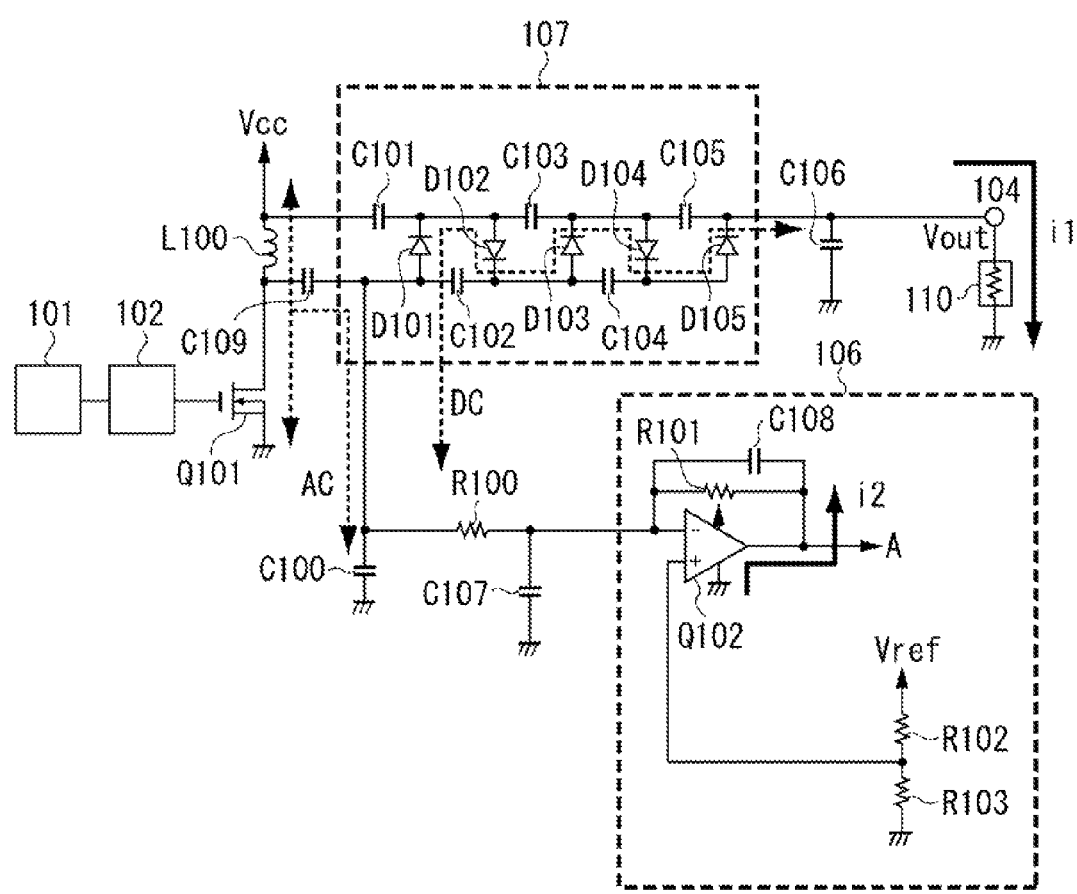
FIG. 1 illustrates an exemplary circuitry configuration of a high-voltage power source according to a first exemplary embodiment of the present invention.

A high-voltage power source according to a first exemplary embodiment of the present invention characteristically includes circuits configured to output a high voltage without using an electromagnetic transformer. FIG. 1 illustrates an exemplary circuitry configuration of the high-voltage power source according to the present exemplary embodiment, which is configured to output a high voltage.

Referring to FIG. 1, a voltage resonance circuit, which is an example of a voltage resonance unit, is constituted by an inductor L100 and a capacitor C100. A voltage generated by the voltage resonance circuit will hereafter be referred to as a "flyback voltage". The inductor L100 is connected and provided between a switching element Q101, which is an example of a switching: unit configured to drive the voltage resonance circuit, and a power supply voltage Vcc (+24V in the present exemplary embodiment).

The inductor L100 is an example of an element having an inductance component, to which the voltage is intermittently applied when the switching, element Q101 is driven (turned on and off). In the present exemplary embodiment, a field-effect transistor Q101 (hereinafter simply referred to as a "metal oxide semiconductor field-effect transistor (MOSFET) Q101") is used as an example of the switching element Q101. In addition, the capacitor C100 is grounded.

The flyback voltage output from the voltage resonance circuit is rectified into a positive voltage by a rectification circuit 107. The rectification circuit 107 functions as a rectification unit configured to rectify the flyback voltage. In the present exemplary embodiment, the rectification circuit is constituted by five diodes and five capacitors. In other words, the rectification circuit has a five-stage configuration.

The rectification circuit 107 includes a diode D101 and a capacitor C101. The diode D101 supplies a current in a normal direction. The capacitor C101, which is connected between a cathode terminal of the diode D101 and the power supply voltage Vcc, charges an electrical charge. By using the diode D101 and the capacitor C101, a positive flyback voltage is yielded.

To more specifically describe the connection method among the circuits, the capacitor C101 is connected to a joint (connection point) of the inductor L close to the power supply voltage. The diode D101 is connected to the capacitor C101 on the other edge thereof.

In addition, the rectification circuit 107, which has a multistage configuration, includes a plurality of diodes, such as diodes D102 through D105, and a plurality of capacitors, such as capacitors C102 through C105. An output from the rectification circuit 107 is grounded via a smoothing capacitor C106 and an output voltage waveform is smoothed.

The rectification circuit 107 is connected to the voltage resonance circuit via a capacitor C109. More specifically, the capacitor C109 is connected at a joint (connection point) between the inductor L100 of the voltage resonance circuit and the MOSFET Q101. The capacitor C109 has a capacitance sufficiently higher than the capacitance of the capacitor C100. Accordingly, the capacitor C109 substantially may not affect the voltage resonance circuit.

The output of the rectification circuit 107 is connected to an output terminal 104 to yield a DC voltage. The DC voltage is applied to a load 110, which requires a high voltage. For example, the load 110 includes a development unit and a transfer unit of an image forming apparatus used for image forming.

As described above, the flyback voltage, which has been increased by the voltage resonance circuit including the inductor L100 and the capacitor C100, can be increased and rectified by and output from the rectification circuit 107, which has the multistage configuration. The level of increase of the value of the high voltage to be output can be calibrated by changing the number of stages of the rectification circuit 107 according to the value of the high voltage required by the load to which the high voltage is to be output.

A method for driving the above-described voltage resonance circuit and the rectification circuit will be described in detail below.

As characteristic to the present exemplary embodiment, the present exemplary embodiment variably controls the value of the high voltage to be output by variably controlling the frequency of the drive frequency signal for the controller 101 by using a controller 101 and a clock oscillator 102. In the following description, an exemplary control operation executed by using a drive frequency signal will be described. In the present exemplary embodiment, the duty ratio of the drive frequency signal (the ratio between a turn-on time and a turn-off time of the signal) is fixed.

The controller 101 outputs a control signal to the clock oscillator 102. The clock oscillator 102 will hereafter be simply referred to as a "VCO" 102. The VCO 102 outputs the drive frequency signal according to the input control signal to a gate terminal of the MOSFET Q101.

In controlling an output voltage Vout by using the drive frequency signal, the output voltage Vout can be raised by decreasing, the frequency of the drive frequency signal. On the other hand, the output voltage Vout can be decreased by increasing the frequency of the drive frequency signal.

More specifically, if the frequency of the drive frequency signal is decreased, the turn-on time of the MOSFET Q101 becomes long. As the turn-on time becomes longer, more energy is stored by the inductor L100 and the maximum value of the flyback voltage output from the voltage resonance circuit becomes greater. As a result, the voltage output from the output terminal 104 becomes higher.

On the other hand, if the frequency of the drive frequency signal is increased, the turn-on time of the MOSFET Q101 becomes shorter. As the turn-on time becomes shorter, the amount of energy stored by the inductor L100 becomes smaller and the maximum value of the flyback voltage from the voltage resonance circuit may become lower. As a result, the voltage from the output terminal 104 becomes lower.

The output voltage Vout can be controlled by variably controlling the frequency of the drive frequency signal in the above-described manner. In order to implement the variable frequency control, the present exemplary embodiment executes an operation for variably controlling the frequency according to a result of a comparison between the feedback of the output voltage Vout and the control signal from the controller 101.

Now, an exemplary configuration and an operation for detecting the current fed to the load 110 will be described in detail below.

Referring to FIG. 1, the voltage resonance circuit is connected to the multistage rectification circuit 107 via the capacitor C109. The capacitor C109 is provided to separate the flow of the direct current to the voltage resonance circuit and the flow of the direct current to the rectification circuit 107 from each other without hindering the flow of the alternating, current between the inductor L100 and the capacitor C100, which constitute the voltage resonance circuit.

In the example illustrated in FIG. 1, the flow of the alternating current is illustrated by a dotted-line arrow with the type of the current ("AC") while the flow of the direct current is illustrated by another dotted-line arrow indicated with the current type "DC".

As a characteristic of the present exemplary embodiment, the present exemplary embodiment employs and executes a configuration and an operation for separating, the flow of the alternating current and direct current, which is implemented by using the capacitor C109. With this configuration, a current i2, which is fed through the following current detection unit 106, becomes the separated flow of the direct current to be equivalent to a current i1, which is applied to the load 110. Accordingly, the present exemplary embodiment can correctly detect the current fed to the load 110 by using the current detection unit 106.

Now, an exemplary configuration and an operation of the current detection unit 106 will be described in detail below.

The current detection unit 106 includes an operational amplifier Q102, resistors R102, R103, and R101, and a capacitor C107. In other words, the current detection unit 106 has a circuitry configuration for setting an offset potential. The current detection unit 106 is connected to the rectification circuit 107 and an input side of the voltage resonance circuit. More specifically, in the example illustrated in FIG. 1, the current detection unit 106 is connected to a line of connecting the inductor L100 of the voltage resonance circuit and the capacitor C100 via the resistor R100.

The resistors R102 and R103 are connected to the operational amplifier Q102. The resistors R102 and R103 are provided to set an offset potential to a non-inverting input terminal. When a predetermined voltage is input, the operational amplifier Q102 executes a control operation for controlling the potential of the input voltage to the same potential as the potential of an inverting input terminal. In the present exemplary embodiment, the predetermined voltage is defined by the following expression:

$$Vref*R103/(R102+R103)$$

The resistor R100 and the capacitor C107 function to prevent superimposition of the alternating current on the inverting input terminal of the operational amplifier Q102. The capacitor C108 has a function for decreasing an AC gain of the operational amplifier Q102.

The current i1, which is applied to the load 110, is equivalent to a current i2, which is fed through the current detection unit 106. Accordingly, a current value detection signal A outputs a voltage value VA corresponding to the current i1 to be applied to the load 110.

The voltage value VA can be expressed by the following expression (1-1):

$$VA = R101*i1 + \{Vref*R103/(R102+R103)\} \quad (1\text{-}1)$$

In addition, the current i1 applied to the load 110 can be expressed by the following expression (1-2):

$$i1 = [VA - \{Vref*R103/(R102+R103)\}]/R101 \quad (1\text{-}2)$$

Accordingly, by monitoring the current value detection signal A, the current fed to the load 110 can be detected.

Now, an exemplary current and voltage waveform generated when the circuits according to the present exemplary embodiment operate will be described in detail below with reference to FIG. 2. A waveform illustrated in FIG. 2 is an example of a waveform used for controlling the current detected by the current detection unit 106 to a constant value (i.e., for executing constant current control).

Figure 2:
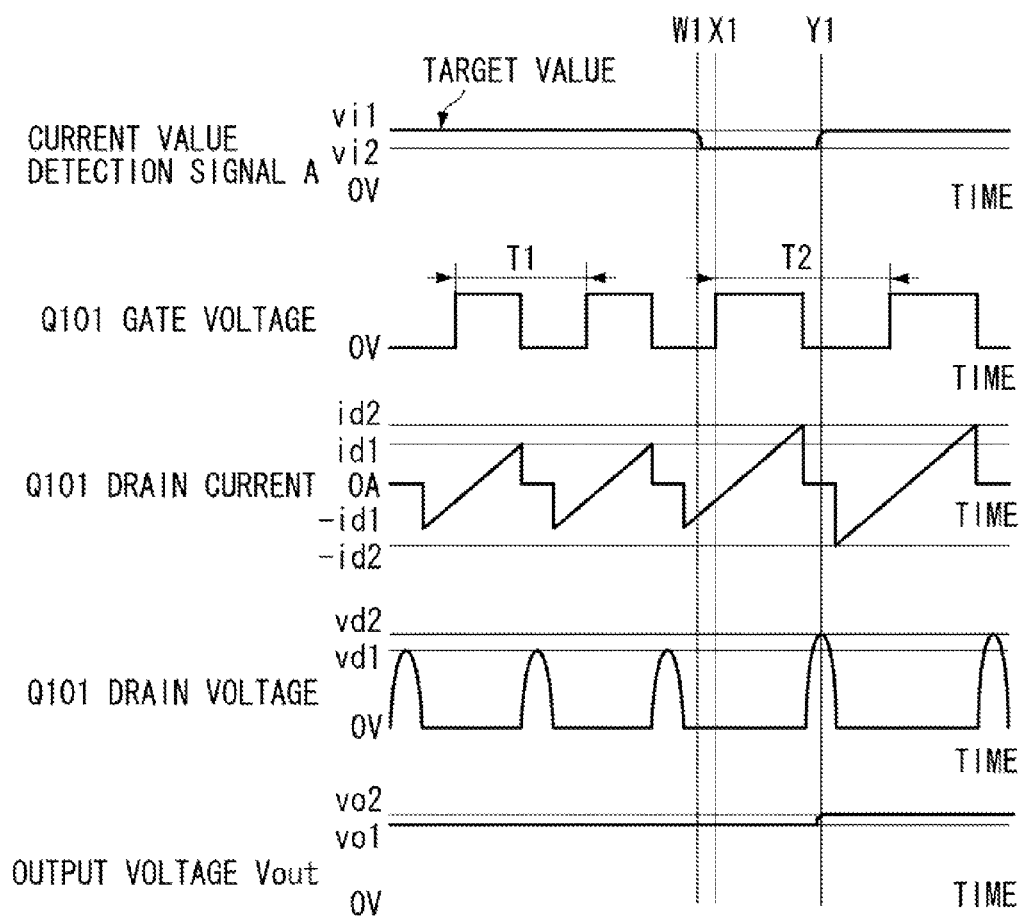
FIG. 2 illustrates a current waveform and a voltage, waveform arising when the circuits of the high-voltage power source according to the first exemplary embodiment operate.

Referring to FIG. 2, the current value detection signal A indicates a waveform generated by converting the current i1 to be applied to the load 110 into the voltage value VA. Furthermore, in the example illustrated in FIG. 2, a Q101 gate voltage indicates a waveform of the voltage applied from the clock oscillator 102 to the gate of the MOSFET Q101. A Q101 drain current indicates a waveform of the current flowing between the drain and source of the MOSFET Q101.

When the MOSFET Q101 is turned on, the Q101 drain current is fed from the power supply voltage Vcc to the inductor L100. The energy is stored in the inductor L100 in an amount corresponding to the time of flow of the Q101 drain current.

A Q101 drain voltage indicates a waveform of the flyback voltage generated by the voltage resonance circuit when the MOSFET Q101 is turned off. A maximum value Vd1 of the flyback voltage is equivalent to the voltage value several times higher than the power supply voltage Vcc.

In the example illustrated in FIG. 2, switching is executed at a timing at which the drain voltage is zero. This operation is generally referred to as a "zero-volt switching (ZVS)". By executing the zero-volt switching, the switching loss or the radiation noise that may arise when the MOSFET Q101 is turned on can be significantly reduced. In the example illustrated in FIG. 2, the output voltage Vout indicates a waveform of the voltage generated on the output terminal 104.

In the present exemplary embodiment, a circuit operation waveform generated when the load current is increased will be described in detail.

In FIG. 2, it is indicated that the resistance of the load has increased at a timing W1. When the output voltage Vout is constant, the load current decreases and the current value detection signal A varies from vi1 to vi2 (vi1>vi2).

The load current can be increased by raising the output voltage Vout. Accordingly, the present exemplary embodiment increases the maximum value of the flyback voltage by extending, the drive (turn on-off) frequency of the MOSFET Q101 and increasing the energy stored in the inductor L100 at a point X1 illustrated in FIG. 2.

If the maximum value of the flyback voltage has varied from vd1 to vd2 (vd2>vd1) at a point Y1 in FIG. 2, the output voltage Vout varies from vo1 to vo2 according to the variation of the maximum value of the flyback voltage. In addition, according to the variation of the output voltage Vout, the current value detection signal A varies from vi2 to vi1. By extending the drive (turn on-off) frequency of the MOSFET Q101, the load current can be increased.

As described above, in the present exemplary embodiment, the multistage rectification circuit is constituted by a plurality of capacitors (capacitative elements) and a plurality of diodes. Furthermore, no electromagnetic transformer is provided to the high-voltage power source, and the high-voltage power source includes circuits configured to output a high voltage. With the above-described configuration, the present exemplary embodiment can implement a small-sized and lightweight high-voltage power source at low costs.

In addition, by using the multistage rectification circuit connected to the voltage resonance circuit via the capacitative element, the flow of the alternating current to the voltage resonance circuit and the flow of the direct current to the rectification circuit 107 can be separated from each other. Accordingly, the current to be applied to the load can be correctly detected by the current detection unit.

According to the present exemplary embodiment, the controller 101 monitors the current value detection signal A. With the above-described configuration, the present exemplary embodiment can easily execute the constant current control by variably controlling the frequency of the frequency signal to apply a constant current to the load.

In the present exemplar y embodiment, the high-voltage power source has the circuitry configuration for outputting a positive voltage. However, the present exemplary embodiment is not limited to this. More specifically, if the diodes of the multistage rectification circuit 107 are connected in order of reverse polarity (i.e., the polarity reverse to the polarity of the diode illustrated in FIG. 1), the high-voltage power source according to the present exemplary embodiment can have a circuitry configuration for outputting a negative voltage.

If the circuitry configuration for outputting a negative voltage is employed, the polarity of the diodes constituting, the multistage rectification circuit 107 is reversely changed from the polarity of the diodes included in the circuit described above with reference to FIG. 1.

Similarly to the operation described above, the multistage rectification circuit 107 executes an operation for amplifying the voltage by repeating the addition of the voltage held by the capacitor to the flyback voltage by the number of times equivalent to the number of rectification stages.

Now, a second exemplary embodiment of the present invention will be described in detail below. The present exemplary embodiment has the configuration similar to the configuration of the first exemplary embodiment except that a voltage detection unit configured to detect the voltage to be applied to the load is additionally included in the present exemplary embodiment.

In the present exemplary embodiment, the configuration similar to that of the first exemplary embodiment will not be described in detail and the additionally provided voltage detection unit only will be described in detail.

Figure 3:
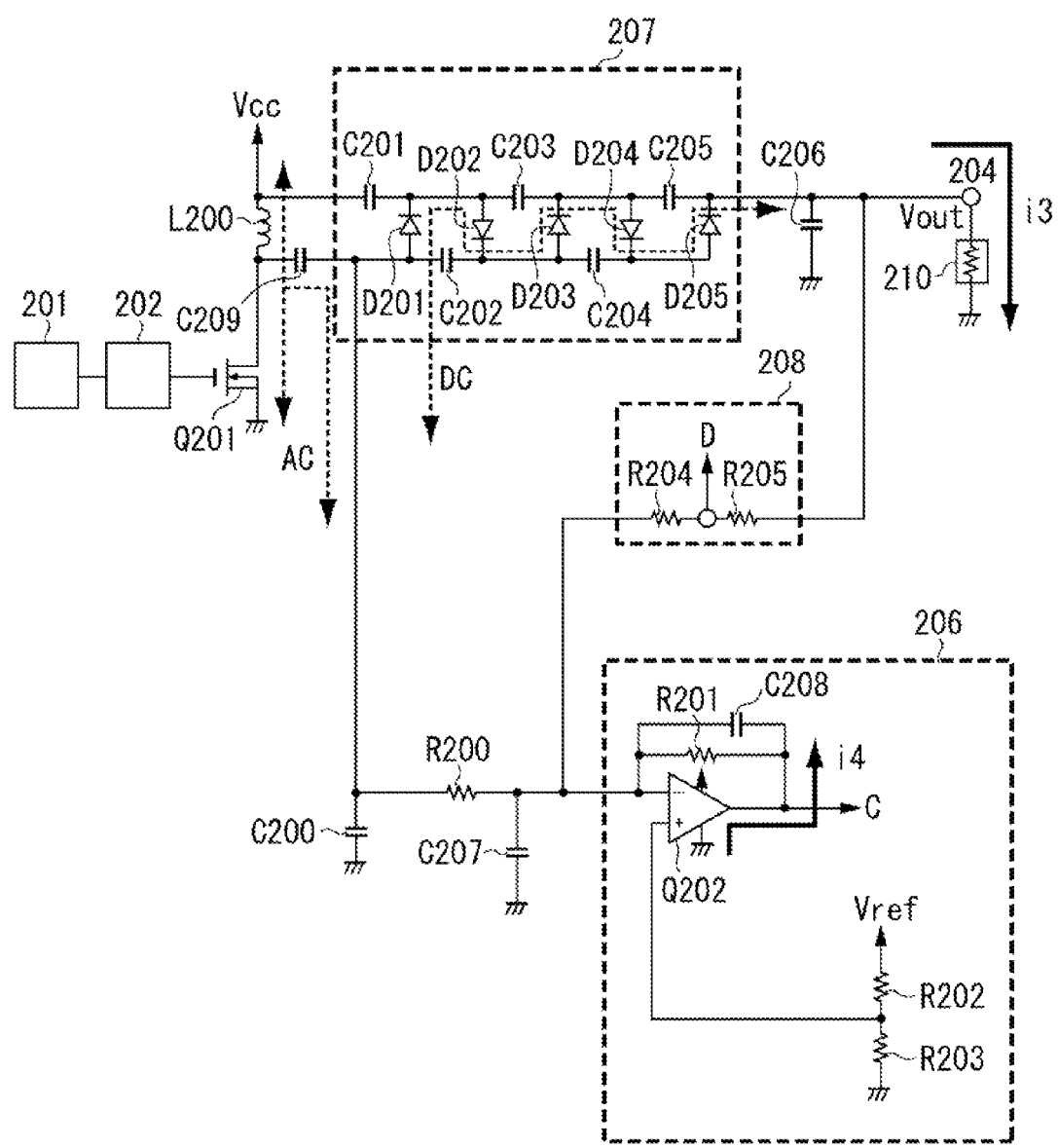
FIG. 3 illustrates an exemplary circuitry configuration of a high-voltage power source according to a second exemplary embodiment of the present invention.

FIG. 3 illustrates an example of it power supply circuit according to the present exemplary embodiment. Referring to FIG. 3, a voltage resonance circuit and a multistage rectification circuit 207 have the configuration similar to the corresponding circuit of the first exemplary embodiment. The circuitry configuration illustrated in FIG. 1 is basically similar to the circuitry configuration illustrated in FIG. 1. More specifically, the circuits illustrated in FIG. 3 correspond to the circuits illustrated in FIG. 1 as described below.

A controller 202 and a clock oscillator 202 illustrated in FIG. 3 correspond to the controller 101 and the clock oscillator 102 illustrated in FIG. 1, respectively. An inductor L200, a capacitor C200, and a switching element Q201 illustrated in FIG. 3 correspond to the inductor L100, the capacitor C100, and the MOSFET Q101 illustrated in FIG. 1, respectively.

Furthermore, the multistage rectification circuit 207 illustrated in FIG. 3 includes capacitors C201 through C205 and diodes D201 through D205, which correspond to the capacitors C101 through C105 and the diodes D101 through D105 of the multistage rectification circuit 107 illustrated in FIG. 1, respectively.

In addition, a current detection unit 206 illustrated in FIG. 3 includes resistors R201 through 203, a capacitor C208, and an operational amplifier Q202, which correspond to the resistors R101 through R103, the capacitor C108, and the operational amplifier Q102 of the current detection unit 106 illustrated in FIG. 1, respectively. Furthermore, a smoothing capacitor C206 and a capacitor C207 illustrated in FIG. 3 correspond to the smoothing capacitor C106 and the capacitor C107 illustrated in FIG. 1 respectively.

As described above, the present exemplary embodiment characteristically includes a voltage detection unit 208 in addition to the circuitry configuration of the first exemplary embodiment. The voltage detection unit 208 is configured not to be directly grounded but is indirectly grounded via, the current detection unit 206.

With the above-described circuitry configuration, in the present exemplary embodiment, a current fed to the load (similar to the current i1 illustrated in FIG. 1) becomes equivalent to a current i4 fed through the current detection unit 206 (similar to the current i2 illustrated in FIG. 1). Accordingly, by detecting a current value detection signal C, the current fed to the load can be detected.

Now, an exemplary configuration and an operation of the voltage detection unit 208 will be described in detail below.

The voltage detection unit 208 includes resistors R204 and R205. The voltage detection unit 208 is connected to the controller 201, the current detection unit 206, and an output terminal.

The output voltage Vout is divided by the resistors R204 and R205. Accordingly, a voltage value detection signal D outputs a voltage value VD corresponding to the output voltage Vout. The voltage value VD can be expressed by the following expression (2-1):

$$VD=[Vout-\{Vref*R203/(R202+R203)\}]*\{R204/(R204+R205)\}+\{Vref*R203/(R202+R203)\} \quad (2\text{-}1)$$

The output voltage Vout applied to the load can be expressed by the following expression (2-2):

$$Vout=[VD-\{Vref*R203/(R202+R203)\}]/\{R204/(R204+R205)\}+\{Vref*R203/(R202+R203)\} \quad (2\text{-}2)$$

As described above by the above-described expressions, the present exemplary embodiment detects the voltage value detection signal D by using the controller 201. Accordingly, the present exemplary embodiment can detect the voltage applied to the load.

Now an exemplary current and voltage waveform generated when the circuits according to the present exemplary embodiment operate will be described in detail below with reference to FIG. 4. The waveform illustrated in FIG. 4 is an example of a waveform used for controlling the voltage detected by the voltage detection unit 208 at a constant value (i.e., for executing constant voltage control).

The current value detection signal C, a Q201 gate voltage, a Q201 drain current, and a Q201 drain voltage are circuit operation waveforms similar to the corresponding circuit operation waveforms of the first exemplary embodiment. In the example illustrated in FIG. 4, the voltage value detection signal D is a waveform generated by converting the output voltage Vout into the voltage value VD. In the example illustrated in FIG. 4, the output voltage Vout indicates a waveform of the voltage generated on the output terminal 204.

In the present exemplary embodiment, a circuit operation waveform generated when the output voltage is increased will be described in detail.

Figure 4:
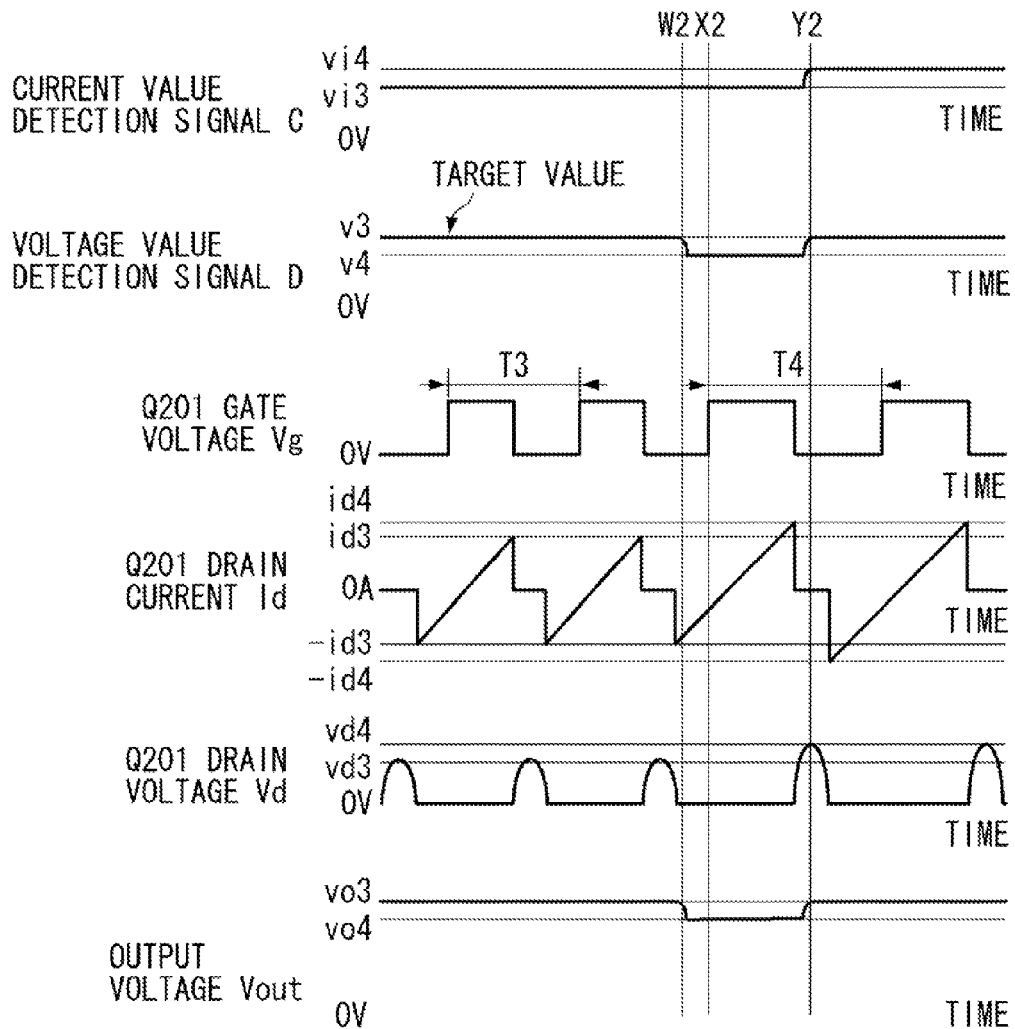
FIG. 4 illustrates a current waveform and it voltage waveform arising when the circuits of the high-voltage power source according to the second exemplary embodiment operate.

In FIG. 4, it is indicated that the resistance of the load has decreased at a timing W2. When the load current is constant (the current value detection signal C is constant at vi3), the output voltage Vout decreases and the voltage value detection signal D varies from v3 to v4 (v3>v4).

Accordingly, the present exemplary embodiment increases the maximum value of the flyback voltage by extending the drive (turn on-off) frequency of the MOSFET Q201 and increasing the energy stored in the inductor L200 at a point X2 illustrated in FIG. 4.

If the maximum value of the flyback voltage has varied from vd3 to vd4 (vd4>vd3) at a point Y2 in FIG. 4, the current value detection signal C varies from vi3 to vi4 and the output voltage Vout varies from vo4 to vo3 (vo3>vo4) according to the variation of the maximum value of the flyback voltage. In addition, according to the variation of the output voltage Vout, the voltage value detection signal D varies from v4 to v3. By extending the drive (turn on-off) frequency of the MOSFET Q201, the output voltage can be increased.

As described above, in the present exemplary embodiment, the multistage rectification circuit is constituted by a plurality of capacitors (capacitative elements) and a plurality of diodes. Furthermore, the high-voltage power source includes circuits configured to output a high voltage. With the above-described configuration, the present exemplary embodiment can implement a small-sized and lightweight high-voltage power source at low costs.

In addition, as described above, the present exemplary embodiment detects the current value detection signal C by using the controller 201. Furthermore, the present exemplary embodiment variably controls the control frequency to apply a constant current to the load. With the above-described configuration, the present exemplary embodiment can execute the constant current control while detecting the voltage applied to the load.

Furthermore, as described above, the present exemplary embodiment detects the voltage value detection signal D by using the controller 201. Furthermore, the present exemplary embodiment variably controls the control frequency to apply a constant voltage to the load. With the above-described configuration, the present exemplary embodiment can execute the constant voltage control while detecting the current fed to the load.

According to the present exemplary embodiment having the above-described configuration, a small-sized and lightweight high-voltage power source whose costs are low can be implemented. In addition, the present exemplary embodiment can execute the constant current control and the constant voltage control in executing the output from the high-voltage power source to the load by using the voltage detection unit 208 in addition to the configuration of the first exemplary embodiment.

Now, a third exemplary embodiment of the present invention will be described in detail below. The present exemplary embodiment has a configuration similar to the configuration of the above-described second exemplary embodiment except that in the present exemplary embodiment, both negative and positive voltages can be output and either the negative or the positive voltage can be output by superposedly outputting the voltages.

Figure 5:
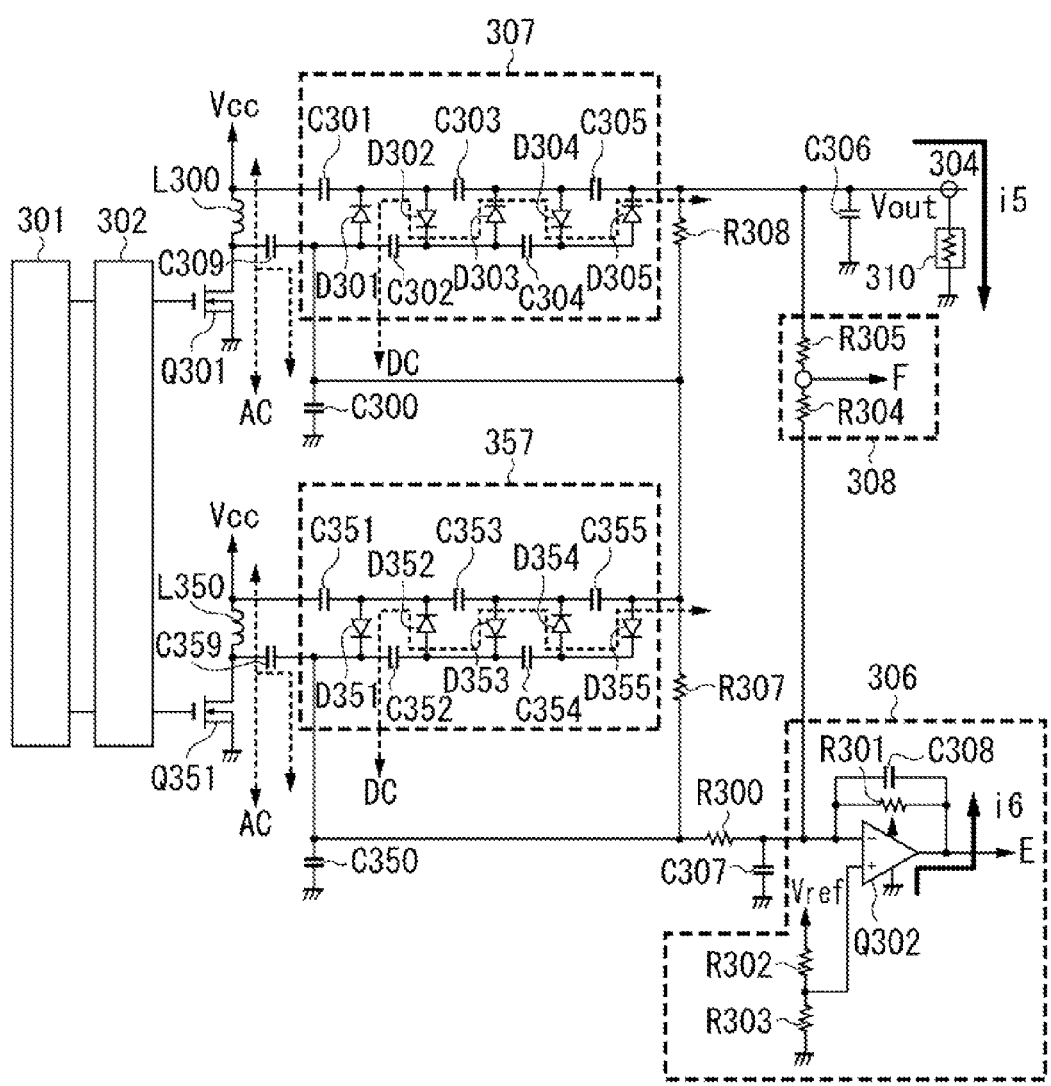
FIG. 5 illustrates an exemplary circuitry configuration of a high-voltage power source according to a third exemplary embodiment of the present invention.

FIG. 5 illustrates an exemplary circuitry configuration of a high-voltage power source according to the present exemplary embodiment. Referring to FIG. 5, a voltage resonance circuit and a multistage rectification circuit execute an operation for controlling the output voltage in a similar manner as the first exemplary embodiment described above.

In the example illustrated in FIG. 5, a power supply circuit according to the present exemplary embodiment has a basic configuration similar to that of the circuit described above in the first exemplary embodiment with reference to FIG. 1.

A controller 302 and a dock oscillator 302 illustrated in FIG. 5 correspond to the controller 101 and the clock oscillator 102 illustrated in FIG. 1, respectively. An inductor L300, a capacitor C300, and a switching element Q301 illustrated in FIG. 5 correspond to the inductor L100, the capacitor C100, and the MOSFET Q101 illustrated in FIG. 1 respectively.

Furthermore, a multistage rectification circuit 307 illustrated in FIG. 5 includes capacitors C301 through C305 and diodes D301 through D305, which correspond to the capacitors C101 through C105 and the diodes D101 through D105 of the multistage rectification circuit 107 illustrated in FIG. 1, respectively.

In addition, a current detection unit 306 illustrated in FIG. 5 includes resistors R301 through 303, a capacitor C308, and an operational amplifier Q302, which correspond to the resistors R101 through R103, the capacitor C108, and the operational amplifier Q102 of the current detection unit 106 illustrated in FIG. 1, respectively. In the example illustrated in FIG. 5, a current i5, which is applied to the load, corresponds to the current i1 illustrated in FIG. 1.

Furthermore, a current i6, which is a detection target current, corresponds to the current i2 illustrated in FIG. 1. In addition, a smoothing capacitor C306 and a capacitor C307 illustrated in FIG. 5 correspond to the smoothing capacitor C106 and the capacitor C107 illustrated in FIG. 1, respectively.

In the present exemplary embodiment, the multistage rectification circuit 307 outputs a positive voltage. In addition to and separately from the multistage rectification circuit 307, another circuit for outputting a negative voltage is provided.

The circuit configured to output a negative voltage is constituted by a multistage rectification circuit 357, which includes the switching element Q351, the inductor L350, the capacitor C350 (the inductor L350 and the capacitor C350 constitute a voltage resonance circuit), capacitors C351 through C355, and diodes D351 through D355. In the multistage rectification circuit 357, the diodes are connected in the reverse orientation from the diodes in the multistage rectification circuit 307. In other words, the multistage rectification circuit 357 is configured to output a negative voltage.

For a positive voltage output unit, the present exemplary embodiment includes a positive voltage generation circuit constituted by the first switching element Q301, the first voltage resonance circuit, and the multistage rectification circuit 307, which increases the positive voltage, in addition, for a negative voltage output unit, the present exemplary embodiment includes a negative voltage generation circuit constituted by the second switching element Q351, the second voltage resonance circuit, and the multistage rectification circuit 357, which increases the negative voltage.

The multistage rectification circuit 307 is connected to the voltage resonance circuit via the capacitor C309. The multistage rectification circuit 357 is connected to the voltage resonance circuit via the capacitor C359.

The controller 301 and the clock oscillator 302 are connected to the positive voltage generation circuit and the negative voltage generation circuit and execute control by using a drive frequency signal in a similar manner as the first exemplary embodiment.

The multistage rectification circuit 307 and the multistage rectification circuit 357 are connected with each other on the Output sides thereof. More specifically, the multistage rectification circuit 307 and the multistage rectification circuit 357 are connected to each other via the bleeder resistors R307 and R308 as illustrated in FIG. 5. The bleeder resistor R308 is provided to the positive voltage generation circuit while the bleeder resistor R307 is provided to the negative voltage generation circuit.

An exemplary configuration and an operation of the current detection unit 306 will be described in detail below. In the present exemplary embodiment, the current detection unit 306 is connected to the controller 301 on the input side of the multistage rectification circuit 307 and on the input side of the multistage rectification circuit 357. In addition, the voltage detection unit 308 is not directly grounded and is indirectly grounded via the current detection unit 306.

Similar to the first exemplary embodiment, the multistage rectification circuit 307 and the multistage rectification circuit 357 can separate the AC flow through the voltage resonance circuit and the DC flow through the multistage rectification circuit 307 and the multistage rectification circuit 357 by using the capacitors C309 and C359 without hindering the AC flow between the inductor L300 and the capacitor C300 constituting the voltage resonance circuit.

More specifically, the current i6 fed to the current detection unit 306 is the separated direct current, which is equivalent to the current i5 applied to the load. Accordingly, by monitoring a current value detection signal E, the current fed to the load can be detected. Similar to the first exemplary embodiment, the present exemplary embodiment can control the current to be detected by the current detection unit 306 at a constant value.

An exemplary operation of the voltage detection unit 308 will be described in detail below. The voltage detection unit 308 is constituted by resistors R304 and R305. The voltage detection unit 308 is connected to the controller 301, the current detection unit 306, and the output terminal 304.

The output voltage Vout is divided by the resistors R304 and R305. Accordingly, a voltage value, detection signal F outputs a voltage value VF corresponding to the output voltage Vout.

Similar to the second exemplary embodiment, the present exemplary embodiment can control the voltage to be detected by the voltage detection unit 308 at a constant value. The voltage value VF can be expressed by the following expression (3-1):

$$VF = [Vout - \{Vref * R303/(R302 + R303)\}] * \qquad (3\text{-}1)$$
$$\{R304/(R304 + R305)\} + \{Vref * R303/(R302 + R303)\}$$

Accordingly, the output voltage Vout applied to the load can be expressed by the following expression (3-2):

$$Vout = [VF - \{Vref * R303/(R302 + R303)\}]/ \qquad (3\text{-}2)$$
$$\{R304/(R304 + R305)\} + \{Vref * R303/(R302 + R303)\}$$

Accordingly, by monitoring the voltage value detection signal F, the present exemplary embodiment can detect the voltage applied to the load.

When the negative voltage is output, the voltage detection unit 308 detects the value obtained by dividing the output voltage. Therefore, the values of the resistors R304 and R305 are adjusted to prevent the voltage value VF from taking a minus potential.

With the above-described configuration, the present exemplary embodiment can implement a small-sized and light-weight high-voltage power source whose costs are low, which is capable of outputting both positive and negative voltages and configured to detect the current fed to the load and the voltage applied to the load.

A fourth exemplary embodiment of the present invention will be described in detail below. The present exemplary embodiment has a characteristic configuration including, in addition to the configuration of the first through the third exemplary embodiments, a voltage supply variable control unit 409 configured to control the output voltage. In the present exemplary embodiment, components, units, circuits, and configurations similar to those of the first through the third exemplary embodiment will not be described in detail.

Figure 6:
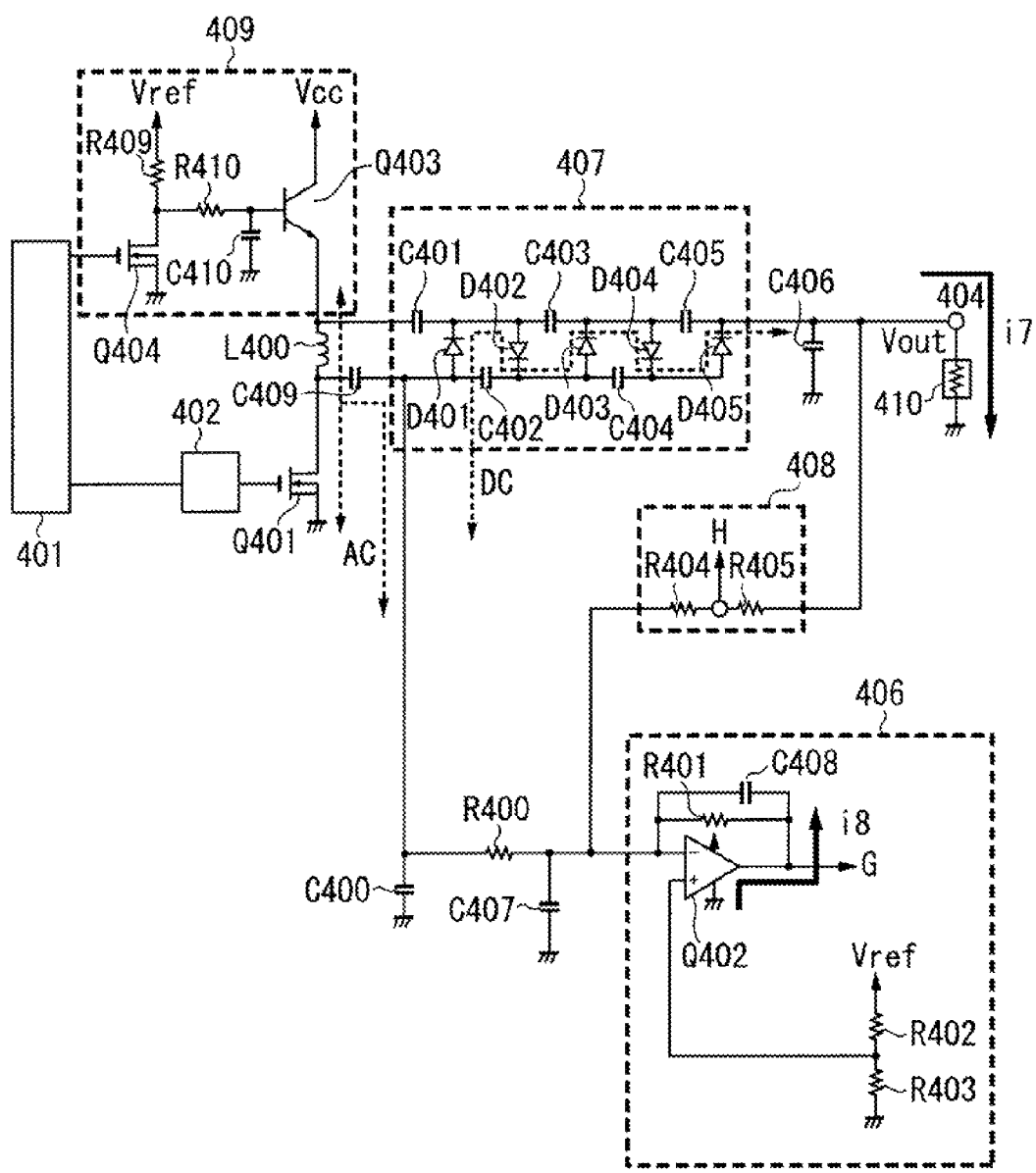
FIG. 6 illustrates an exemplary circuitry configuration of a high-voltage power source according to a fourth exemplary embodiment of the present invention.
Figure 7:
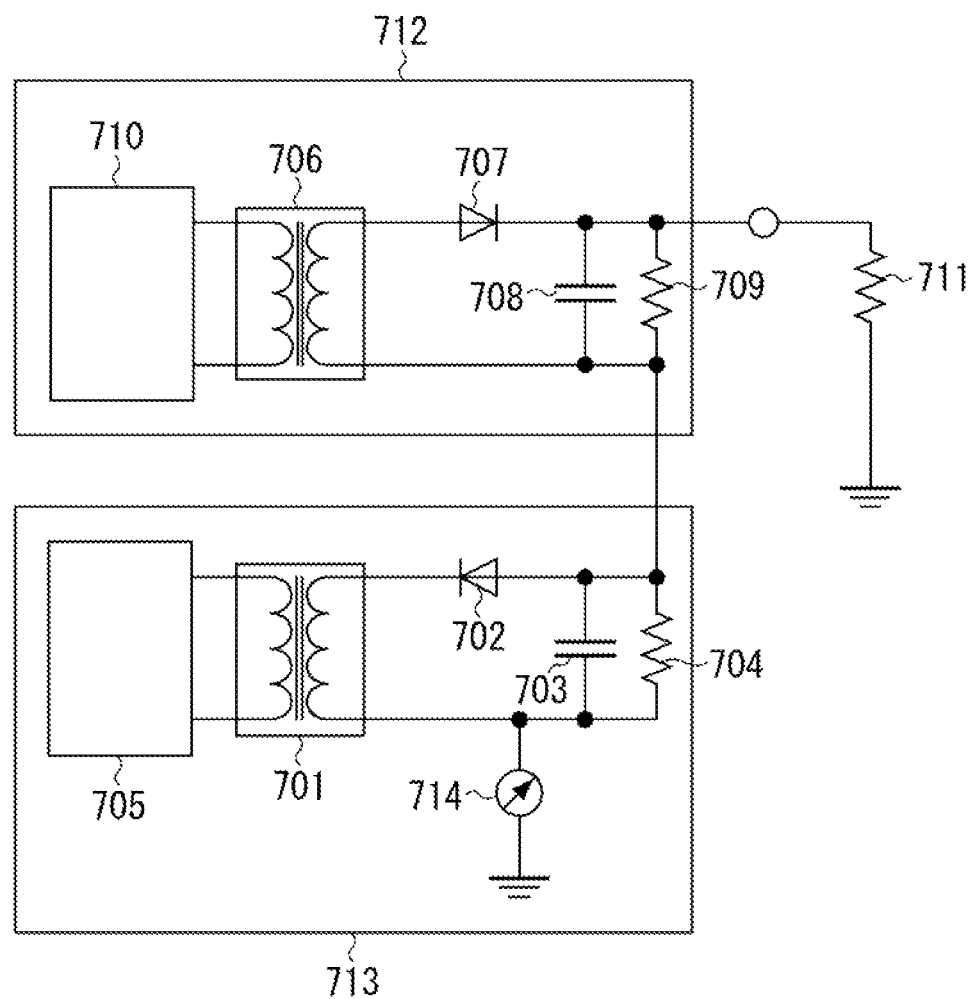
FIG. 7 illustrates an outline configuration of a conventional high-voltage power source that uses an electromagnetic transformer.

FIG. 6 illustrates an exemplary circuitry configuration at a high-voltage power source according to the present exemplary embodiment. Referring to FIG. 6, a voltage resonance circuit, a multistage rectification circuit 407, a current detection unit 406, and a voltage detection unit 408 execute an operation similar to the operation of each corresponding unit of the first exemplary embodiment described above.

In the example illustrated in FIG. 6, a power supply circuit according to the present exemplary embodiment has a basic configuration similar to that of the circuit described above in the first exemplary embodiment with reference to FIG. 1.

A controller 402 and a clock oscillator 402 illustrated in FIG. 6 correspond to the controller 101 and the clock oscillator 102 illustrated in FIG. 1, respectively. An inductor L400, a capacitor C400, and a switching element Q401 illustrated in FIG. 6 correspond to the inductor L100, the capacitor C100, and the MOSFET Q101 illustrated in FIG. 1, respectively.

Furthermore, the multistage rectification circuit 407 illustrated in FIG. 6 includes capacitors C401 through C405 and diodes D401 through D405, which correspond to the capacitors C101 through C105 and the diodes D101 through D105 of the multistage rectification circuit 107 illustrated in FIG. 1, respectively.

In addition, the current detection unit 406 illustrated in FIG. 6 includes resistors R401 through 403, a capacitor C408, and an operational amplifier Q402, which correspond to the resistors R101 through R103, the capacitor C108, and the operational amplifier Q102 of the current detection unit 106 illustrated in FIG. 1, respectively. In the example illustrated in FIG. 6, a current i7, which is applied to the load, corresponds to the current i1 illustrated in FIG. 1.

Furthermore, a current i8, which is a detection target current, corresponds to the current i2 illustrated in FIG. 1. In addition, a smoothing, capacitor C406 and a capacitor C407 illustrated in FIG. 6 correspond to the smoothing capacitor C106 and the capacitor C107 illustrated in FIG. 1, respectively.

Now, an exemplary operation of the voltage supply variable control unit 409, which is a characteristic of the present exemplary embodiment, will be described in detail below.

A controller 401 is connected to a switching element Q404. In the present exemplary embodiment, a field-effect transistor Q404 (hereinafter simply referred to as a "MOSFET Q404") is used as an example of the switching element Q404. The MOSFET Q404 and a resistor R409 convert a pulse width modulation (PWM) signal from the controller 401 into a clock signal of the reference voltage Vref.

The converted clock signal is converted into an analog DC signal by a low-pass filter circuit including a resistor R410 and a capacitor C410 to cause the base potential of the transistor Q403 to vary. Accordingly, the voltage of a level lowered by the level equivalent to the voltage between the base and emitter of the transistor Q403 is supplied to the inductor L400. The voltage supply variable control unit 409 can variably control the voltage to be supplied to the inductor L400 in the above-described manner.

Exemplary output voltage control according to the present exemplary embodiment, which is executed by variably controlling the voltage to be supplied to the inductor L400, will be described in detail below. A drive frequency signal is input by the clock oscillator 402 to the gate terminal of the MOSFET Q401.

In the present exemplary embodiment, the drive frequency signal is a signal of a predetermined frequency to prevent hard switching of the switching element Q401 and is input by the controller 401 to the switching element Q401 via the clock oscillator 402.

Instead of setting a fixed value to the frequency of the drive frequency signal, the value of the frequency of the drive frequency signal can be variably set. In controlling the output voltage, the output voltage can be raised by increasing the voltage to be supplied to the inductor L400. On the other hand, the output voltage can be decreased by decreasing the voltage to be supplied to the inductor L400.

To more specifically describe the control of the output voltage, if the voltage to be supplied to the inductor L400 is raised, the maximum value of the flyback voltage generated by the voltage resonance circuit increases. In other words, in this case, the voltage output from the output terminal 404 rises. On the other hand, if the voltage to be supplied to the inductor L400 is decreased, the maximum value of the flyback voltage waveform generated by the voltage resonance circuit decreases. To paraphrase this, in this case, the voltage output from the output terminal 404 becomes lower.

The present exemplary embodiment can control the output voltage by variably controlling the voltage to be supplied to the inductor L400 in the above-described manner.

Similar to the above-described exemplary embodiments, the present exemplary embodiment can control the current to be detected by the current detection unit 406 at a constant value and control the voltage to be detected by the voltage detection unit 408 at a constant value.

With the above-described configuration, the present exemplary embodiment can implement a small-sized and lightweight high-voltage power source whose costs are low, which is capable of outputting both positive and negative voltages and configured to detect the current fed to the load and the voltage applied to the load. In addition, by variably controlling the voltage to be supplied to the inductor, the present exemplary embodiment can appropriately control the output voltage. As a result, the present exemplary embodiment can easily output a wide range of voltages.

In the above-described first through the fourth exemplary embodiments, the rectification circuit is constituted by five diodes and five capacitors. Accordingly, if the flyback voltage is 200 (V), for example, the present exemplary embodiment can increase the voltage to about 600 V.

The number of diodes and capacitors is not limited to the number described above. In other words, a diode or a capacitor can be added by the number determined according to the necessary output voltage.

The high-voltage power source according to an exemplary embodiment of the present invention can be applied to an image forming apparatus, such as a printer, a copying machine, or a facsimile apparatus. A case where the high-voltage power source according to an exemplary embodiment of the present invention is applied to an electrophotographic type printer, which is an example of the image forming apparatus, will be described in detail below.

The high-voltage power source according to the exemplary embodiments described above can be applied as a high-voltage power source for applying a high voltage to an image forming unit of an electrophotographic type printer.

Figure 8A:
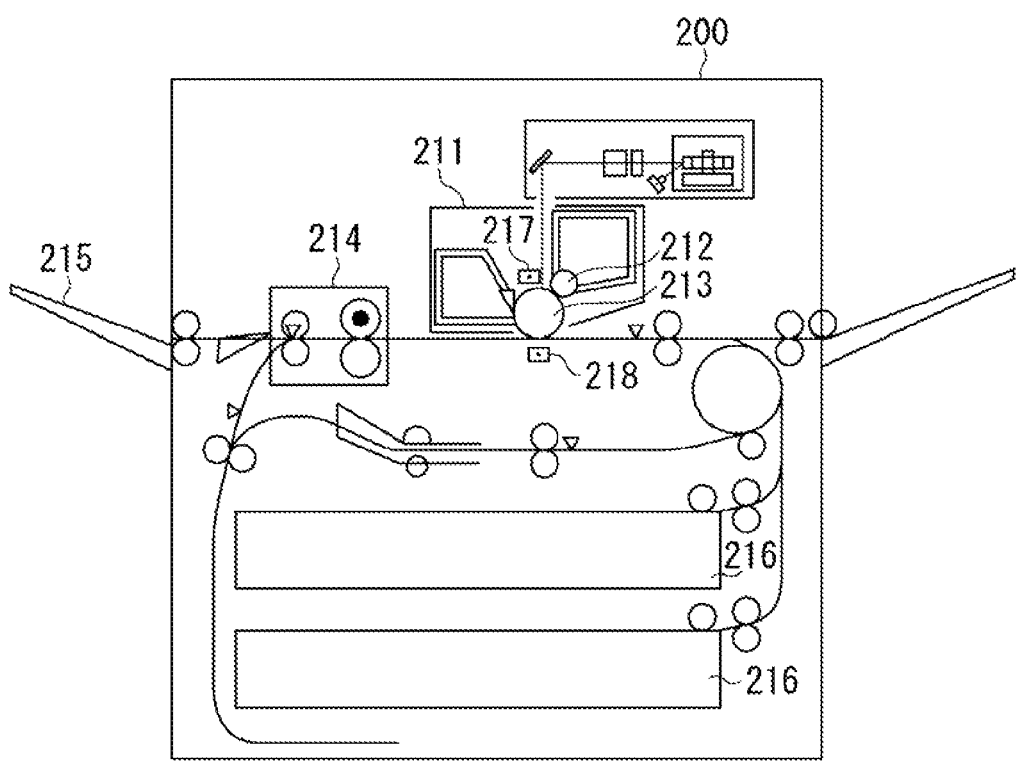
FIG. 8A illustrates an example of a high-voltage power source according to an exemplary embodiment of the present invention that can be applied to an image forming apparatus.

FIG. 8A illustrates exemplary main components of a laser beam primer, which is an example of the electrophotographic type printer. Referring to FIG. 8A, a laser beam printer 200 includes a photosensitive drum 211, a charging unit 217, and a development unit 212. The photosensitive drum 211 is an image hearing member onto which a latent image is formed. The charging unit 217 is configured to evenly charge the surface of the photosensitive drum 211. The development unit 212 is configured to develop the latent image formed on the photosensitive drum 211 by using a toner.

A transfer unit 218 transfers the toner image, which has been developed on the photosensitive drum 211, onto a sheet (not illustrated), which is a recording material fed from a cassette 216. Furthermore, the toner image transferred onto the sheet is fixed by a fixing device 214. Then, the sheet having the image fixed thereon is discharged onto a tray 215. The photosensitive drum 211, the charging unit 217, the development unit 212, and the transfer unit 218 constitute the image forming unit.

Figure 8B:
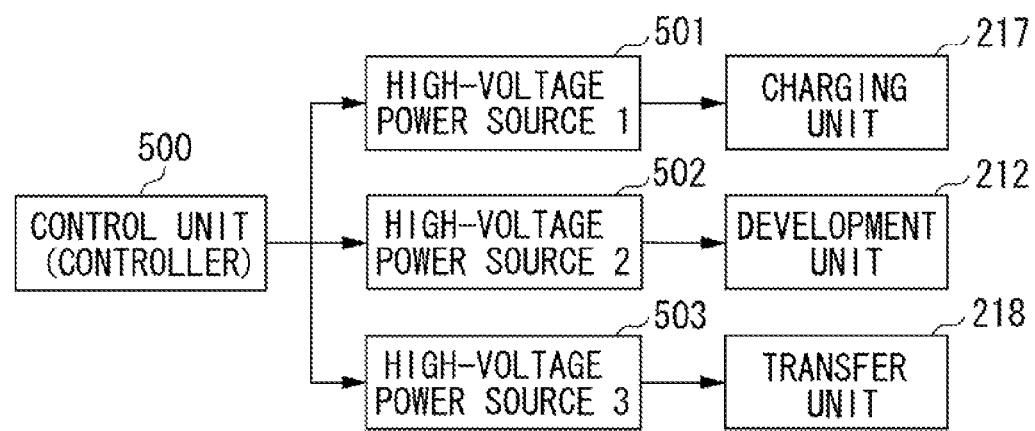
FIG. 8B illustrates an example of a high-voltage power source according to an exemplary embodiment of the present invention that can be applied to an image forming apparatus.

FIG. 8B illustrates an exemplary configuration for outputting a high voltage, which has been output from each of a plurality of high-voltage power sources (i.e., the power supply circuit according to the first through the fourth exemplary embodiment described above) that are provided to the laser beam printer 200, to each of the charging unit 217, the development unit 212, and the transfer unit 218.

Referring, to FIG. 8B, a high-voltage power source 1 501 outputs a high voltage to the charging unit 217. A high-voltage power source 2 502 outputs a high voltage to the development unit 212. A high-voltage power source 3 503 outputs a high voltage to the transfer unit 218.

The value of the high voltage output from each high-voltage power source 1 through 3 is controlled according to a control signal output from a controller (control unit) 500 to a value of a necessary voltage. For example, if the high voltage has been output to the charging unit 217, the current supplied to the charging unit 217 is detected by the above-described current detection unit. The output is adjusted to control the detected current value to a predetermined value.

Moreover, if the high voltage has been output to the transfer unit 218, the current supplied to the transfer unit 218 is detected by the above-described current detection unit. The output is adjusted to control the detected current value to a predetermined value.

Furthermore, if the high voltage has been output to the development unit 212, the voltage supplied to the development unit 212 is detected by the above-described voltage detection unit. The output is adjusted to control the detected voltage value to a predetermined value. As described above, the high-voltage power source of the present invention can be applied to apply a high voltage to execute image forming.

As described above, if the high-voltage power source according to the first through the fourth exemplary embodiments of the present invention is applied to a high-voltage power source of an electrophotographic type printer, the size, the costs, and the weight of the image forming apparatus can be more easily reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-156922 filed Jul. 9, 2010, which is hereby incorporated by reference herein in its entirety.

The invention claimed is:

1. A high-voltage power source comprising:
   a switching unit;
   an inductor connected to the switching unit and to which a voltage is applied according to driving of the switching unit;
   a rectification unit connected to the inductor and includes a plurality of rectification elements each configured to rectify the voltage generated in the inductor and a plurality of capacitors each configured to hold the voltage rectified by the rectification element; and
   a separation capacitor connected between the inductor and the rectification unit and configured to separate an alternating current flowing through the inductor and a direct current flowing through the plurality of rectification elements in the rectification unit from each other.

2. The high-voltage power source according to claim 1, further comprising a detection unit configured to detect the direct current separated by the separation capacitor.

3. The high-voltage power source according to claim 2, further comprising a voltage detection unit configured to detect a voltage output from the rectification unit,
   wherein the voltage detection unit is connected to the detection unit.

4. The high-voltage power source according to claim 2, wherein the detection unit includes an operational amplifier configured to convert the direct current to a voltage.

5. The high-voltage power source according to claim 1, further comprising a voltage varying unit configured to control and change a voltage input to the inductor.

6. The high-voltage power source according to claim 1, wherein the rectification unit includes:
   a first capacitor, one end thereof being connected to the inductor;
   a first diode, a cathode terminal thereof being connected to the other end of the first capacitor;
   a second capacitor, one end thereof being connected to an anode terminal of the first diode; and
   a second diode, a cathode terminal thereof being connected to the other end of the second capacitor,
   wherein a voltage output from the rectification unit is a positive voltage.

7. The high-voltage power source according to claim 1, wherein the rectification unit includes:
   a first capacitor, one end thereof being connected to the inductor;
   a first diode, an anode terminal thereof being connected to the other end of the first capacitor;
   a second capacitor, one end thereof being connected to a cathode terminal of the first diode; and
   a second diode, an anode terminal thereof being connected to the other end of the second capacitor,
   wherein a voltage output from the rectification unit is a negative voltage.

8. The high-voltage power source according to claim 1, wherein the rectification unit outputs a voltage by boosting the voltage generated in the inductor according to a number of the rectification elements and the capacitors.

9. The high-voltage power source according to claim 1, further comprising a signal supply unit configured to supply a drive signal for driving the switching unit at a predetermined frequency, wherein the signal supply unit can change a frequency of the drive signal.

10. An image forming apparatus comprising:
    an image forming unit configured to form an image; and
    a high-voltage power source configured to apply a high voltage to the image forming unit,
    wherein the high-voltage power source includes:
    a switching unit;
    an inductor connected to the switching unit and to which a voltage is applied according to driving of the switching unit;
    a rectification unit connected to the inductor and includes a plurality of rectification elements each configured to rectify the voltage generated in the inductor and a plurality of capacitors each configured to hold the voltage rectified by the rectification element; and
    a separation capacitor connected between the inductor and the rectification unit and configured to separate an alternating current flowing through the inductor and a direct current flowing through the plurality of rectification elements in the rectification unit from each other.

11. The image forming apparatus according to claim 10, further comprising a detection unit configured to detect the direct current separated by the separation capacitor.

12. The image forming apparatus according to claim 11, wherein the image forming unit includes a charging unit configured to charge an image bearing member or a transfer unit configured to transfer a toner image formed on the image bearing member, and
    wherein the detection unit is configured to detect a current fed to the charging unit or the transfer unit.

13. The image forming apparatus according to claim 11, wherein the detection unit includes an operational amplifier configured to convert the direct current to a voltage.

14. The image forming apparatus according to claim 10, further comprising a voltage detection unit configured to detect a voltage output from the rectification unit,
    wherein the image forming unit includes a development unit configured to develop a latent image formed on an image bearing member, and
    wherein a voltage to be output to the development unit is controlled according to the voltage detected by the voltage detection unit.

15. The image forming apparatus according to claim 10, wherein the rectification unit includes:
    a first capacitor, one end thereof being connected to the inductor;
    a first diode, a cathode terminal thereof being connected to the other end of the first capacitor;
    a second capacitor, one end thereof being connected to an anode terminal of the first diode; and
    a second diode, a cathode terminal thereof being connected to the other end of the second capacitor,
    wherein a voltage output from the rectification unit is a positive voltage.

16. The image forming apparatus according to claim 10, wherein the rectification unit includes:
    a first capacitor, one end thereof being connected to the inductor;
    a first diode, an anode terminal thereof being connected to the other end of the first capacitor;
    a second capacitor, one end thereof being connected to a cathode terminal of the first diode; and
    a second diode, an anode terminal thereof being connected to the other end of the second capacitor, wherein a voltage output from the rectification unit is a negative voltage.

17. The image forming apparatus according to claim 10, wherein the rectification unit outputs a voltage by boosting the voltage generated in the inductor according to a number of the rectification elements and the capacitors.

18. The image forming apparatus according to claim 10, further comprising a signal supply unit configured to supply a drive signal for driving the switching unit at a predetermined frequency, wherein the signal supply unit can change a frequency of the drive signal.

* * * * *